(12) United States Patent
Macbeth et al.

(10) Patent No.: US 8,364,514 B2
(45) Date of Patent: Jan. 29, 2013

(54) MONITORING GROUP ACTIVITIES

(75) Inventors: Steven W. Macbeth, Snohomish, WA (US); Roland L. Fernandez, Woodinville, WA (US); Brian R. Meyers, Issaquah, WA (US); Desney S. Tan, Kirkland, WA (US); George G. Robertson, Seattle, WA (US); Nuria M. Oliver, Seattle, WA (US); Oscar E. Murillo, Seattle, WA (US); Mary P. Czerwinski, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1393 days.

(21) Appl. No.: 11/426,818

(22) Filed: Jun. 27, 2006

(65) Prior Publication Data

US 2007/0300174 A1    Dec. 27, 2007

(51) Int. Cl.
*G06Q 10/00* (2006.01)

(52) U.S. Cl. ............... 705/7.25; 705/7.38; 705/7.42; 706/14; 706/15; 706/45; 709/205; 715/700; 715/701; 715/708; 715/709; 715/714; 715/739; 715/751

(58) Field of Classification Search ............ 705/1.1, 705/7, 11; 715/709
See application file for complete search history.

(56) References Cited

U.S. PATENT DOCUMENTS

| | | | |
|---|---|---|---|
| 5,530,861 A | 6/1996 | Diamant et al. | |
| 5,737,728 A | 4/1998 | Sisley et al. | |
| 5,999,911 A | 12/1999 | Berg et al. | |
| 6,021,403 A | 2/2000 | Horvitz et al. | |
| 6,112,243 A | 8/2000 | Downs et al. | |
| 6,141,649 A * | 10/2000 | Bull | 705/7.42 |
| 6,233,570 B1 * | 5/2001 | Horvitz et al. | 706/11 |
| 6,307,544 B1 * | 10/2001 | Harding | 715/709 |
| 6,456,974 B1 | 9/2002 | Baker et al. | |
| 6,513,031 B1 | 1/2003 | Fries et al. | |
| 6,571,215 B1 | 5/2003 | Mahapatro | |
| 6,601,233 B1 | 7/2003 | Underwood | |
| 6,727,914 B1 | 4/2004 | Gutta | |
| 6,754,874 B1 | 6/2004 | Richman | |
| 6,757,887 B1 | 6/2004 | Kaplan | |
| 6,799,208 B1 | 9/2004 | Sankaranarayan et al. | |
| 6,829,585 B1 * | 12/2004 | Grewal et al. | 705/7.14 |
| 7,017,146 B2 | 3/2006 | Dellarocas et al. | |
| 7,020,652 B2 | 3/2006 | Matz et al. | |

(Continued)

OTHER PUBLICATIONS

Final Office Action, mailed Dec. 28, 2009, in U.S. Appl. No. 11/426,796, 33 pgs.

(Continued)

*Primary Examiner* — Elizabeth Rosen
(74) *Attorney, Agent, or Firm* — Shook, Hardy & Bacon L.L.P.

(57) ABSTRACT

A unique monitoring system and method is provided that involves monitoring user activity in order to facilitate managing and optimizing the utilization of various system resources. In particular, the system can monitor user activity, detect when users need assistance with their specific activities, and identify at least one other user that can assist them. Assistance can be in the form of answering questions, providing guidance to the user as the user completes the activity, or completing the activity such as in the case of taking on an assigned activity. In addition, the system can aggregate activity data across users and/or devices. As a result, problems with activity templates or activities themselves can be more readily identified, user performance can be readily compared, and users can communicate and exchange information regarding similar activity experiences. Furthermore, synchronicity and time-sensitive scheduling of activities between users can be facilitated and improved overall.

13 Claims, 10 Drawing Sheets

U.S. PATENT DOCUMENTS

| | | | |
|---|---|---|---|
| 7,058,947 | B1 | 6/2006 | Raja et al. |
| 7,062,510 | B1 | 6/2006 | Eldering |
| 7,089,222 | B1 | 8/2006 | Lannert et al. |
| 7,136,865 | B1 | 11/2006 | Ra et al. |
| 7,155,700 | B1 | 12/2006 | Sadhu et al. |
| 7,194,685 | B2 | 3/2007 | Morrison |
| 7,194,726 | B2 | 3/2007 | Allen et al. |
| 7,244,231 | B2 * | 7/2007 | Dewing et al. ............... 600/300 |
| 7,331,034 | B2 | 2/2008 | Anderson |
| 7,363,282 | B2 | 4/2008 | Karnawat et al. |
| 7,389,514 | B2 | 6/2008 | Russell et al. |
| 7,562,346 | B2 | 7/2009 | Jhanwar et al. |
| 7,562,347 | B2 | 7/2009 | Baumgart et al. |
| 7,647,400 | B2 | 1/2010 | Abbott et al. |
| 2001/0040590 | A1 | 11/2001 | Abbott et al. |
| 2002/0007289 | A1 | 1/2002 | Malin et al. |
| 2002/0054097 | A1 | 5/2002 | Hetherington et al. |
| 2002/0065701 | A1 | 5/2002 | Kim et al. |
| 2002/0152102 | A1 | 10/2002 | Brodersen et al. |
| 2003/0004763 | A1 | 1/2003 | LaBlanc et al. |
| 2003/0046401 | A1 | 3/2003 | Abbott et al. |
| 2003/0078826 | A1 * | 4/2003 | Swanke et al. ............... 705/9 |
| 2003/0130979 | A1 | 7/2003 | Matz et al. |
| 2003/0135384 | A1 | 7/2003 | Nguyen |
| 2003/0144868 | A1 | 7/2003 | MacIntyre et al. |
| 2003/0182651 | A1 | 9/2003 | Secrist et al. |
| 2004/0039627 | A1 | 2/2004 | Palms et al. |
| 2004/0093593 | A1 | 5/2004 | Jhanwar et al. |
| 2004/0133457 | A1 | 7/2004 | Sadiq et al. |
| 2004/0143477 | A1 | 7/2004 | Wolff |
| 2004/0179528 | A1 * | 9/2004 | Powers et al. ............... 370/392 |
| 2004/0219928 | A1 * | 11/2004 | Deeds ............... 455/456.1 |
| 2004/0243774 | A1 | 12/2004 | Horvitz |
| 2004/0247748 | A1 | 12/2004 | Bronkema |
| 2004/0261026 | A1 | 12/2004 | Corson |
| 2005/0080625 | A1 | 4/2005 | Bennett et al. |
| 2005/0086046 | A1 | 4/2005 | Bennett |
| 2005/0091098 | A1 | 4/2005 | Brodersen et al. |
| 2005/0091635 | A1 | 4/2005 | McCollum et al. |
| 2005/0091647 | A1 | 4/2005 | McCollum et al. |
| 2005/0097559 | A1 | 5/2005 | He |
| 2005/0138603 | A1 | 6/2005 | Cha |
| 2005/0144004 | A1 | 6/2005 | Bennett et al. |
| 2005/0210441 | A1 | 9/2005 | Tarr et al. |
| 2005/0232423 | A1 | 10/2005 | Horvitz et al. |
| 2006/0004680 | A1 | 1/2006 | Robarts et al. |
| 2006/0004891 | A1 | 1/2006 | Hurst-Hiller et al. |
| 2006/0010206 | A1 | 1/2006 | Apacible et al. |
| 2006/0015387 | A1 | 1/2006 | Moore et al. |
| 2006/0015478 | A1 | 1/2006 | Beringer et al. |
| 2006/0015479 | A1 | 1/2006 | Wood et al. |
| 2006/0026531 | A1 * | 2/2006 | Lin et al. ............... 715/809 |
| 2006/0048059 | A1 | 3/2006 | Etkin |
| 2006/0065717 | A1 | 3/2006 | Hurwitz et al. |
| 2006/0106497 | A1 | 5/2006 | Ishikawa et al. |
| 2006/0107219 | A1 | 5/2006 | Ahya et al. |
| 2006/0168550 | A1 | 7/2006 | Muller et al. |
| 2006/0195411 | A1 | 8/2006 | Knight et al. |
| 2006/0212331 | A1 | 9/2006 | Lundberg et al. |
| 2006/0241997 | A1 | 10/2006 | Bhatawdekar et al. |
| 2006/0242651 | A1 | 10/2006 | Zielinski et al. |
| 2006/0282436 | A1 | 12/2006 | Chaudhuri et al. |
| 2006/0293933 | A1 | 12/2006 | Millhouse et al. |
| 2007/0033640 | A1 | 2/2007 | Herness et al. |
| 2007/0067199 | A1 | 3/2007 | Shine et al. |
| 2007/0106497 | A1 | 5/2007 | Ramsey et al. |
| 2007/0118804 | A1 | 5/2007 | Raciborski et al. |
| 2007/0168885 | A1 | 7/2007 | Muller et al. |
| 2007/0191979 | A1 | 8/2007 | Zeng et al. |
| 2007/0198969 | A1 | 8/2007 | Facemire et al. |
| 2007/0219798 | A1 | 9/2007 | Wang et al. |
| 2007/0276715 | A1 | 11/2007 | Beringer et al. |
| 2007/0282659 | A1 | 12/2007 | Bailey et al. |

OTHER PUBLICATIONS

Final Office Action, mailed Jan. 6, 2010, in U.S. Appl. No. 11/426,846, 11 pgs.

BARDRAM. "Activity-Based Computing—Lessons Learned and Open Issues" (Apr. 20, 2004) 1st International Workshop on Computer Support for Human Tasks and Activities, 5 pages.

NonFinal Office Action, U.S. Appl. No. 11/426,804, mailed Jul. 15, 2008, 11 pgs.

Final Office Action, U.S. Appl. No. 11/426,804, mailed Jan. 16, 2009, 11 pgs.

NonFinal Office Action, U.S. Appl. No. 11/426,804, mailed Jul. 9, 2009, 12 pgs.

NonFinal Office Action, U.S. Appl. No. 11/426,810, mailed Jul. 11, 2008, 10 pgs.

Final Office Action, U.S. Appl. No. 11/426,810, mailed Dec. 31, 2008, 12 pgs.

NonFinal Office Action, U.S. Appl. No. 11/426,827, mailed Aug. 21, 2008, 12 pgs.

Final Office Action, U.S. Appl. No. 11/426,827, mailed Mar. 9, 2009, 15 pgs.

NonFinal Office Action, U.S. Appl. No. 11/426,839, mailed Sep. 19, 2008, 17 pgs.

Final Office Action, U.S. Appl. No. 11/426,839, mailed Feb. 26, 2009, 19 pgs.

NonFinal Office Action, U.S. Appl. No. 11/426,846, mailed Jul. 11, 2008, 10 pgs.

Final Office Action, U.S. Appl. No. 11/426,846, mailed Jan. 12, 2009, 11 pgs.

NonFinal Office Action, U.S. Appl. No. 11/426,846, mailed Jun. 19, 2009, 13 pgs.

NonFinal Office Action, U.S. Appl. No. 11/426,796, mailed May 13, 2009, 20 pgs.

Office Action for U.S. Appl. No. 11/426,827, Applicant: Macbeth et al., filed Jun. 27, 2006, Confirmation No. 1525, mail date Sep. 29, 2009.

NonFinal Office Action—in U.S. Appl. No. 11/426,827 mailed Sep. 29, 2009, 17 pgs.

NonFinal Office Action—U.S. Appl. No. 11/426,810 mailed Nov. 3, 2009, 10 pgs.

Non Final Office Action of U.S. Appl. No. 11/426,796, mailed Apr. 14, 2010.

Non Final Office Action of U.S. Appl. No. 11/426,830, mailed Mar. 31, 2010.

Non Final Office Action of U.S. Appl. No. 11/426,788, mailed Apr. 26, 2010.

Notice of Allowance of U.S. Appl. No. 11/426,827, mailed May 5, 2010.

Sean Zhang; Barbara G. Ryder; Willaim Landi "Program Decomposition for Pointer Aliasing: A Step toward Practical Analyses" SIGSOFT'96 CA, USA © 1996 ACM 0-89791-797-9/96/0010.

Chung-Horng Lung; Xia Xu Marzia Zaman "Software Architecture Decomposition Using Attributes" International Journal of Software Engineering and Knowledge Engineering vol. 17, Issue: 5(2007) pp. 599-613 Received Mar. 31, 2006 Accepted Oct. 16, 2006.

Qin, Shengchao; He, Jifeng; Chin, Wei Ngan "Towards an Automated Approach to Hardware/Software Decomposition" Dspace@MIT, Issue Date Jan. 2003.

Bardram Jakob E. "Activity-based computing; support for mobility and collaboration in ubiquitous computing" Pers Ubiquit Comput (2005) 9:312-321 Springer-Verlag London Limited 2005.

Bardram Jakob E.; Christensen, Henrik Baerbak "Real-time Collaboration in Activity-based Architectures"Proceedings of the Fourth Working IEEE/IFIP Conference on Software Architecture (WICSA'04) 0-7695-2172-X/04 © 2004 IEEE.

Bardram Jakob E.; Bunde-Pedersen, Jonathan; Soegaard, Mads "Support for ActivityBased Computing in a Personal Computing Operating System" CHI 2006 Proceedings. • Activing: Design Implications Apr. 22-27, 2006 * Montreal, Quebec, Canada Badram, Jakob E.; Kjaer, Rasmus E.; Pedersen, Michael "Context-Aware User Authentication—Supporting Proximity-Based Loging in Pervasive Computing" A.K. Dey et al. (Eds.): UbiComp 2003, LNCS 2864, pp. 107-123, 2003, Springer-Verlag Berling Heidelberg 2003.

Office Action in U.S. Appl. No. 11/426,846 mailed May 12, 2010.

Office Action in U.S. Appl. No. 11/426,832 mailed Jun. 23, 2010.

Final Office Action in U.S. Appl. No. 11/426,804 mailed Jul. 7, 2010.

Non Final Office Action, U.S. Appl. No. 11/426,804 mailed Nov. 24, 2010, 17 pp.
Final Office Action, U.S. Appl. No. 11/426,832, mailed Dec. 22, 2010, 27 pp.
Final Office Action in U.S. Appl. No. 11/426,830 mailed Sep. 14, 2010.
Non Final Office Action in U.S. Appl. No. 11/426,788 mailed Oct. 12, 2010.
Notice of Allowance in U.S. Appl. No. 11/426,796 mailed Sep. 9, 2010.
Office Action in U.S. Appl. No. 11/426,788 mailed Oct. 12, 2010.
Non Final Office Action in U.S. Appl. No. 13/168,176, mailed May 23, 2012, 13 pages.
NonFinal Office Action—mailed Dec. 16, 2011 in U.S. Appl. No. 13/168,176.
NonFinal Office Action, Mailed: Aug. 1, 2011, U.S. Appl. No. 11/426,832.
Final Office Action, U.S. Appl. No. 11/426,832 mailed Jan. 6, 2012.
Notice of Allowance mailed Apr. 12, 2011, U.S. Appl. No. 11/426,788.

Chung-Horng Lung; Xia Xu;Marzia Zaman "Software Architecture Decomposition Using Attributes" International Journal of Software Engineering and Knowledge Engineering vol. 17, Issue: 5(2007) pp. 599-613 Received Mar. 31, 2006 Accepted Oct. 16, 2006.
Bardram, Jakob E.; Kjaer, Rasmus E.; Pedersen, Michael "Context-Aware User Authentication—Supporting Proximity-Based Login in Pervasive Computing" A.K. Dey et al. (Eds.): UbiComp 2003, LNCS 2864, pp. 107-123, 2003, Springer-Verlag Berlin Heidelberg 200.
Bardram, Jakob E.; Christensen, Henrik Baerbak, "Real-time Collaboration in Activity-based Architectures" Proceedings of the Fourth Working IEEE/IFIP Conference on Software Architecture (WICSA '04) 0-7695-2172-X/04 2004 IEEE.
Bardram, Jakob E.; Bunde-Pedersen, Jonathan; Soegaard, Mads "Support for ActivityBased Computing in a Personal Computing Operating System" CHI 2006 Proceedings—Activity: Design Implications Apr. 22-27, 2006—Montreal, Quebec, Canada.
Bardranm Hajib E, "Activity-based computing: support for mobility and collaboration in ubiquitous computing" Pers Ubiquit Comput (2005) 9: 312-322 Springer-Verlag London Limited 2005.

* cited by examiner

MONITORING GROUP ACTIVITIES

CROSS REFERENCE TO RELATED APPLICATIONS

This application is related to U.S. Ser. No. 11/426,846 filed on Jun. 27, 2006, entitled "LOGGING USER ACTIONS WITHIN ACTIVITY CONTEXT"; Ser. No. 11/426,839 filed on Jun. 27, 2006, entitled "RESOURCE AVAILABILITY FOR USER ACTIVITIES ACROSS DEVICES"; Ser. No. 11/426,832 filed on Jun. 27, 2006, entitled "CAPTURE OF PROCESS KNOWLEDGE FOR USER ACTIVITIES"; Ser. No. 11/426,830 filed on Jun. 27, 2006, entitled "PROVIDING USER INFORMATION TO INTROSPECTION"; Ser. No. 11/426,810 filed on Jun. 27, 2006, entitled "MANAGING ACTIVITY-CENTRIC ENVIRONMENTS VIA USER PROFILES"; Ser. No. 11/426,827 filed on Jun. 27, 2006, entitled "CREATING AND MANAGING ACTIVITY-CENTRIC WORKFLOW"; Ser. No. 11/426,804 filed on Jun. 27, 2006, entitled "ACTIVITY-CENTRIC ADAPTIVE USER INTERFACE"; Ser. No. 11/426,796 filed on Jun. 27, 2006, entitled "ACTIVITY-CENTRIC DOMAIN SCOPING"; and Ser. No. 11/426,788 filed on Jun. 27, 2006, entitled "ACTIVITY-CENTRIC GRANULAR APPLICATION FUNCTIONALITY". The entirety of each of the above applications is incorporated herein by reference.

BACKGROUND

Traditionally, communications between humans and machines have been relatively inefficient. Human-to-human communication typically involves spoken language combined with hand and facial gestures or expressions, with the humans understanding the context of the communication. Human-machine communication is typically much more constrained, with devices like keyboards and mice for input, and symbolic or iconic images on a display for output, and with the machine understanding very little of the context. For example, although communication mechanisms (e.g., speech recognition systems) continue to develop, these systems do not automatically adapt to the activity of a user. As well, traditional systems do not consider contextual factors (e.g., user state, application state, environment conditions) to improve communications and interactivity between humans and machines.

Activity-centric concepts are generally directed to ways to make interaction with computers more seamless and efficient (by providing some additional context for the communication). Traditionally, computer interaction centers around one of three pivots: 1) document-centric, 2) application-centric, and 3) device-centric. However, most conventional systems cannot operate upon more than one pivot simultaneously, and those that can do not provide much assistance managing the pivots. Hence, users are burdened with the tedious task of managing every little aspect of their tasks/activities.

A document-centric system refers to a system where a user first locates and opens a desired data file before being able to work with it. Similarly, conventional application-centric systems refer to first locating a desired application, then opening and/or creating a file or document using the desired application. Finally, a device-centric system refers to first choosing a device for a specific activity and then finding the desired application and/or document and subsequently working with the application and/or document with the chosen device.

Accordingly, since the traditional computer currently has little or no notion of activity built in to it, users are provided little direct support for translating the "real world" activity they are trying to use the computer to accomplish and the steps, resources and applications necessary on the computer to accomplish the "real world" activity. Thus, users traditionally have to assemble "activities" manually using the existing pieces (e.g., across documents, applications, and devices). As well, once users manually assemble these pieces into activities, they need to manage this list mentally, as there is little or no support for managing this on current systems.

Moreover, the activity-centric concept is based upon the notion that users are leveraging a computer to complete some real world activity. Historically, a user has had to mentally outline and prioritize the steps or actions necessary to complete a particular activity before starting to work on that activity on the computer. Conventional systems do not provide for systems that enable the identification and decomposition of actions necessary to complete an activity. In other words, there is currently no integrated mechanism available that can dynamically understand what activity is taking place as well as what steps or actions are necessary to complete the activity.

In addition, the conventional computer system has used the desktop metaphor, where there is only one desktop. These systems store documents in essentially a single filing cabinet. As the complexity of activities rises and as the similarity of the activities diverges, this structure does not offer user-friendly access to necessary resources for a particular activity.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application provides one or more systems and methods that monitor online and/or offline activities of one or more users in order to identify users who have previously or who are currently involved in an activity similar or related to a target activity. In particular, the system, for example, can identify a current or target activity in which a user (e.g., target user) is engaged. The system can then recommend other users (e.g., assisting user(s)) to answer questions for or otherwise provide assistance to the target user. Assisting users can be identified and prioritized as such according to various parameters including but not limited to the target activity, experience with the target activity or certain aspects of the target activity, availability (e.g. free time, schedule open, proximity, or location), social distance from the target user, work patterns and interruptibility, success/failure history with respect to the target activity, cost, current state, current activity, and/or performance rating for the target activity or for activities related or similar to the target activity.

The target activity can be identified either explicitly via direct user input or implicitly by evaluating the content the target user is viewing and related metadata such as the file name or type, application name or type, and device type. Other contextual information that is or could be relevant to the task at hand such as the user's physiological state, location, date, as well as the activity template that the target activity was created from can also be considered and analyzed. Similarly, the request for assistance can be made explicitly by the target user. For example, the target user can specifically ask the system for help with a target activity. In addition, the user may want to delegate a target activity, in which case the user can request a list of assisting users who meet one or more parameters. Alternatively, the system can monitor the user involved in a particular activity and recognize an implicit need for assistance. For instance, the system can detect that the user's time or effort spent on an activity has exceeded a threshold, and then can conclude that the user needs help.

The system can also automatically detect frustration or stress in the user via physiological and environmental sensors and then offer or provide some type of assistance accordingly. Baseline or "normal" parameters for each user can be established in view of the fact that different body types and sizes and personalities can display different physical, mental, and emotional responses to similar situations. For example, an elevated heart rate during tax return preparation may be considered normal for one user and not an indication that help is needed but for another user, the inverse may be true.

User activity performed across various devices such as a PDA, laptop, desktop computer, smartphone, and/or pocket PC phone can be recorded in one or more logs. The systems and methods provided herein can monitor such logs in order to aggregate data about one or more activities. From this data, statistics related to performance, success rate, frequency of problem, and the like can be provided to users or can be employed to gauge a target user's success, performance, or efficiency with respect to other users. The data can also be used to predict when assistance is needed and automatically offer assistance (e.g., by providing at least one of the following: one or more names of available assisting users or link(s) to relevant resources such as websites or specific files).

To further facilitate improving awareness of user activities, a user interface can be employed that displays user activities such as their current and/or previous activities. A history of past activities and their performance time or date can be provided as well for the respective users as desired.

In addition, users can be visually monitored by other users within a common group (e.g., department or team) to better coordinate their work (avoid duplicate work, talk to person your work is dependent on, etc). The system can provide some of this coordination automatically through monitoring and analyzing current and/or previous user activities, schedules or calendars, work histories, skill levels, and other background information associated with each user.

Users can also be monitored on an individual basis (e.g. users are unrelated) such as by a supervisor to view work progress or overall activity in general. By visualizing user activity in this manner, the system can infer user intent which can facilitate determining whether a particular user is able and/or willing to assist a target user. Assistance can include answering questions, providing guidance, tools or resources (e.g., files, reference materials, etc.), or receiving an assignment. The user interface can also display this information in a timeline format and integrate the user's calendar data as well to obtain a more meaningful determination regarding the user's intent or state.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

Figure 1:
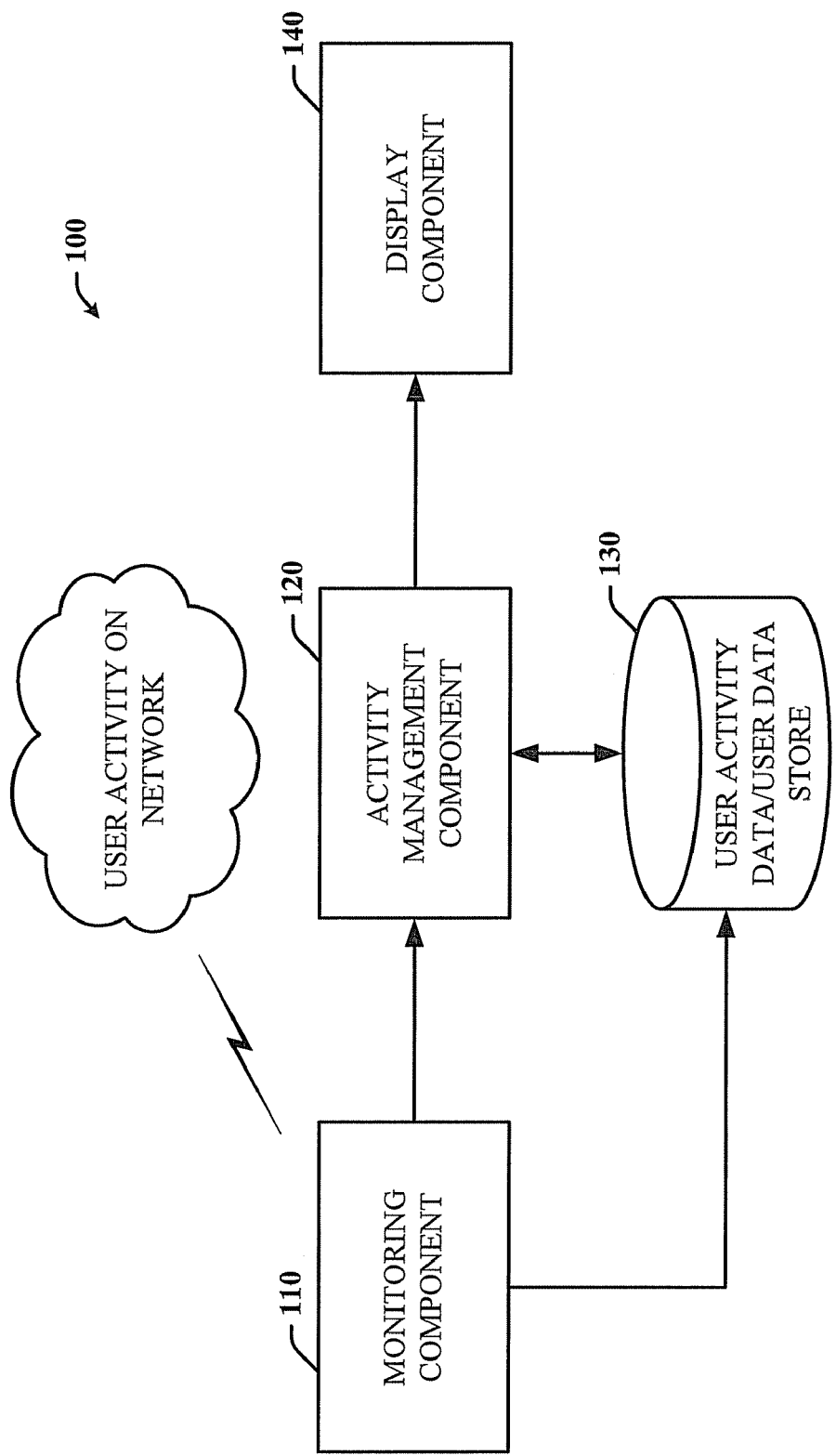
FIG. 1 is a block diagram of an activity monitoring system that facilitates managing and optimizing user activity automatically to improve overall user productivity and efficiency.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and methods provided herein facilitate regulating and managing individual users or groups of users in order to maximize the efficiencies of system and human resources, improve user performance, and minimize user inefficiencies. As described in further detail below, such systems and methods involve monitoring user activities in order to identify user weaknesses, user strengths, user state (e.g., availability, current activity, priority of current activity, etc.), user experience, and skill sets with regard to particular activities or group projects. By doing so, the systems and methods can optimize the allocation of available system and human resources. For example, when a user needs assistance on a particular task, the system and/or method can identify the most relevant user to assist with the task. The most relevant user in this instance could be the user who has successfully completed a similar task, who received assistance on a similar problem with the task, or who created or assigned the task.

It should be appreciated that an activity can involve a plurality of documents and software applications (e.g., designing a new ad campaign for print and TV using a laptop, projector, and computerized whiteboards) and/or operations performed within each one (e.g., printing a document, resizing an image, etc.). Rather than monitoring only one document in isolation or independent of the other documents that are in-use, the subject systems and methods monitor and manage the activity in its entirety.

Referring now to FIG. 1, there is a general block diagram of an activity monitoring system 100 that facilitates automated management and optimization of user activity to improve overall user productivity and efficiency. The system 100 includes a monitoring component 110 that can monitor user activity performed on one or more networks or servers. Such activity can be monitored in real time such as when the user(s) is online or has an established connection with the network. In addition, offline activities can be captured locally and later communicated to the monitoring component 110 when online.

The monitoring component 110 can monitor and collect activity data from one or more users on a continuous basis, when prompted, or when certain activities are detected (e.g., a particular application or document is opened or modified). Activity data can include but is not limited to the following: the application name or type, document name or type, activity template name or type, start/end date, completion date, category, priority level for document or matter, document owner, stage or phase of document or matter, time spent (e.g., total or per stage), time remaining until completion, and/or error occurrence. User data about the user who is engaged in such activity can be collected as well. This can include the user's name, title or level, certifications, group memberships, department memberships, experience with current activity or activities related thereto, current physiological and emotional state, and/or current projects.

The activity and user data can be communicated to an activity management component 120 which can process and evaluate the data to assess user performance on their respective activities and the current allocation of system and human resources based on the ongoing user activities. To further facilitate this assessment, historical information for the user can also be employed to aid in determining whether the most appropriate user is working on tasks or activities suited for their experience and skill level. Such information can be accessed from a user activity data/user data store 130. Data collected from the monitoring component 110 can be stored in the data store 130 as well. A display component 140 can generate one or more reports automatically based on the collected and processed data. Alternatively, the display component 140 can present the desired information on a user interface which can be accessed locally or remotely by one or more users (e.g., authorized users, group members, department manager, etc.).

In practice, for instance, monitoring user activity in the prescribed manner allows for the automation of various aspects of project management which can include comparing the performance of people working on similar activities and finding the best people for those types of activities such as for future assignments. Likewise, the system can determine the performance of people working on similar activities and identify the lower performers (e.g., for additional training and/or assigning different types of activities in the future). Performance can be based on factors such as activity types, progress, difficulty level, success rates, completion times, error rates, assistance requests made, and/or assistance provided.

Other examples of project management include finding users working on lower-priority activities and reassigning them to higher-priority activities. In a conventional management system, these users would appear to be "busy" or "unavailable" to take on a new task and thus would be excluded from consideration. However, in the subject system, several factors are considered and some can be given more weight than others. As a result, skilled users can attend to more urgent matters as needed and then return to their lower priority assignments.

The delegation of new assignments can be determined in part by the user activity data and user data and other pertinent historical data in order to best leverage current knowledge/ mindset. In addition, some types of activities can be performed using different devices or activity templates. The collected and processed activity and user data can also be utilized to identify the most optimum device(s) and activity template(s) to use for a specific type of activity. An activity template can describe overall actions, operations, and resources associated with an activity. Take for example, an email activity template. The email activity template can include a number of fields such as, but not limited to the following: To, From, bcc, cc, attachment, subject, body, priority, and date. It should be appreciated that the email template can be customized or modified depending on the user's needs, company, or purpose. Thus, more than one template can exist or can be created for the same activity.

Some errors or problems can be due to the process, protocol, policy, template, or device required by an employer or company rather than due to user inexperience. Furthermore, activities may be performed successfully but not in accordance with company or government policies. Thus, monitoring user activity can facilitate auditing how activities are performed to look for or isolate patterns of user problems, system abuse, common errors incurred by users, or to ensure company/government policies are complied with. Activity templates or company policies can also be reviewed to identify which if any should be updated or replaced (e.g., based on low performance, widely varying performance among workers, high error rates, etc.).

Figure 2:
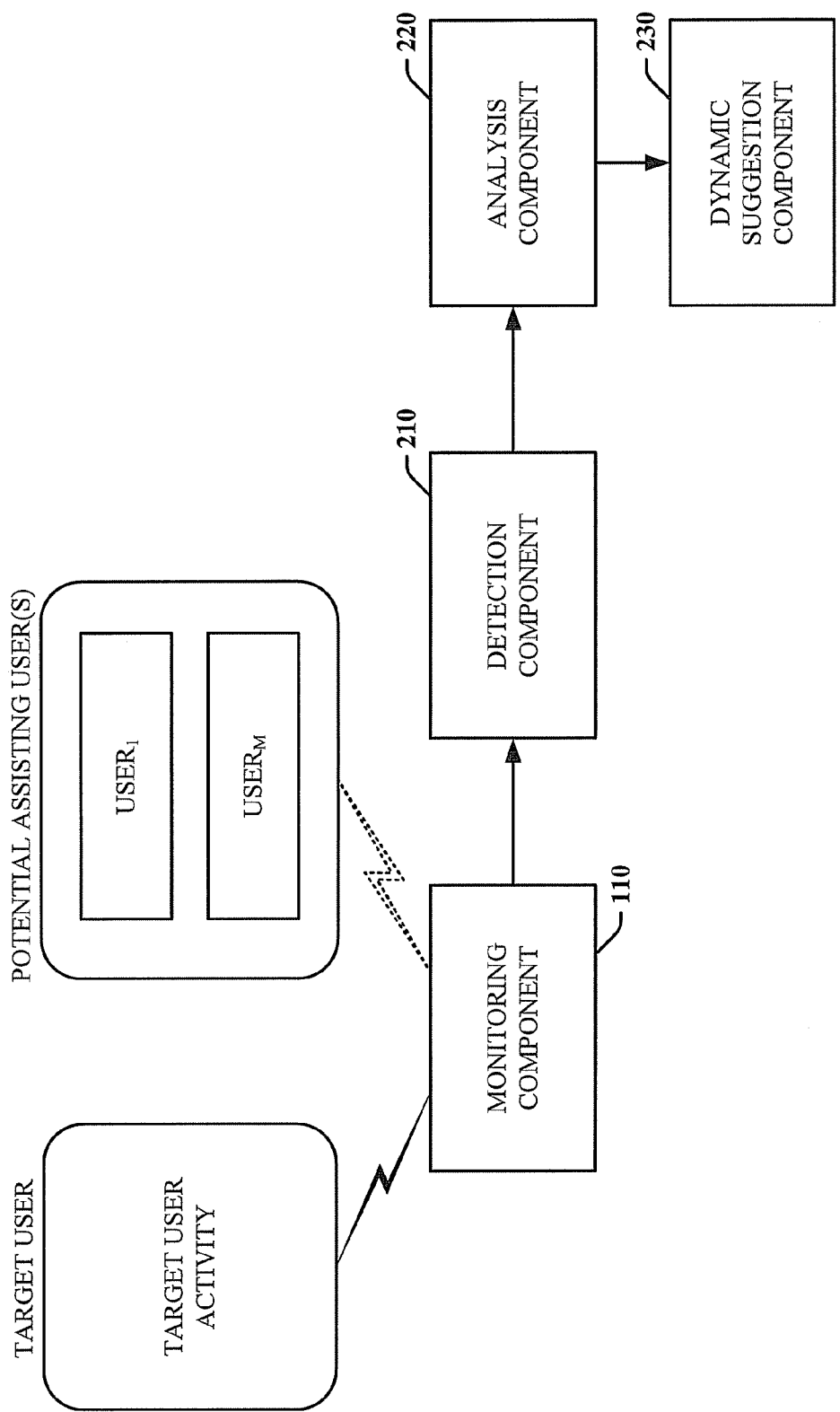
FIG. 2 is a block diagram of an activity monitoring system that facilitates managing user activity in part by dynamically determining applicable and available human or system resources to provide to users needing assistance in order to improve overall user productivity and efficiency.

In addition to monitoring overall user activity and managing resource allocation and projects, the activity monitoring system 100 can also provide assistance to users who are experiencing problems in an activity or who have questions regarding their activity. FIG. 2 presents a block diagram of another aspect of the activity monitoring system 200 that facilitates managing user activity in part by dynamically identifying relevant human or system resources to provide to users needing assistance. More specifically, a detection component 210 can be employed to detect indications of user problems with a certain activity or part thereof or to detect explicit user requests for assistance. Essentially, the detection component 210 can operate cooperatively with the monitoring component 110. As user activity is monitored, signs of impending or existing problems or requests for help can be detected and addressed dynamically as they arise. The detection component 210 can be trained on explicit user actions and can learn from other implicit user actions it observes over a period of time. In practice, the detection component 210 can conclude or infer that based on a target user's current course of action or behavior, a problem is likely to arise unless the system intervenes with assistance or a problem has arisen and the target user would benefit from some type of assistance.

Various parameters can be set in order to trigger the detection component 210. For example, activities or portions thereof (e.g. such as in a multi-part activity) can be allotted a particular amount of completion time. When the allotted time (threshold) and/or a grace period are exceeded, the detection component 210 can recognize that the user is experiencing a problem with the activity. An analysis component 220 can evaluate the user's information and the activity related information to determine the most appropriate assistance for the given target activity.

Recall that the monitoring component 110 continues to monitor other user activity in addition to the target activity. As a result, the system 200 can locate other users who are currently working on or involved with an activity similar to the target activity. Following, a suggestion component 230 can provide the name and/or contact information for at least one assisting user. Many different factors can be considered before selecting the assisting users. These factors can include but are not limited to the assisting user's experience with the target activity or with other activities related thereto, expert level, certifications, department or group memberships, current state, current activity, performance rating or history with the target activity (e.g., success or error rate for completing activities similar or identical to the target activity), and/or the cost of providing assistance (e.g., assisting user could be working on a higher priority matter or could be at a higher billing level within the company—both of which constitute higher costs).

The assisting user's interruptibility or observed work patterns can also be considered. For example, suppose a first user historically works in 2-hour intervals. At the time of the target user's need for help, the first user could be 45 minutes into the 2-hour interval. Thus, it may not be an opportune time to interrupt the first user. Another potential assisting user (second user) may be on a regular 8 AM-5 PM work schedule and may currently be browsing the internet. Under these and perhaps other circumstances such as skill level and experience with the target activity, the second user can appear to be more interruptible.

The many different factors can be prioritized or weighted differently to facilitate determining the most appropriate assisting users based on the target activity and any other related information (e.g., target user, time of day, project, etc.). Take for instance success rate with a particular activity can be weighted more than experience with the activity. Imagine that Tina needs assistance with replacing the toner in her printer and that Tim, Tom, and Tammy have previously changed the toner in their printers. Tim has only changed it once and required assistance. Tom has replaced his toner 7 times in the past year but his printer has been repaired after each replacement because of the toner. Tammy has replaced her toner 4 times in the past year without any follow-up problems, repairs, etc. Although Tammy has less experience, her success rate appears to be higher than Tom. Thus, Tammy's name and contact information can be provided to Tina (target user) as a viable assisting user.

As a means to facilitate communication between the target and assisting users, a user interface can be designed to automatically create an instant message or chat window to open between the users or the assisting user's office can be called via the target user's computer. Alternatively, an email can be automatically generated to the assisting user(s). The target user can send it immediately or can personalize it before sending it. It should be appreciated that more than one assisting user can be suggested to the user. The user can then select at least one user from the list and/or refer back to the list for additional assistance if necessary. The system 200 can also allow users to opt-in or opt-out of receiving and providing assistance.

In addition to providing a target user with human assistance, the system 200 can provide relevant tools or resources such as website links, reference materials, or other files. Though not depicted in FIG. 2, the system 200 can also suggest other activities of interest to users who desire such information. For example, the system 200 can provide related website links or information on similar projects or activities that the user is not currently involved with.

Figure 3:
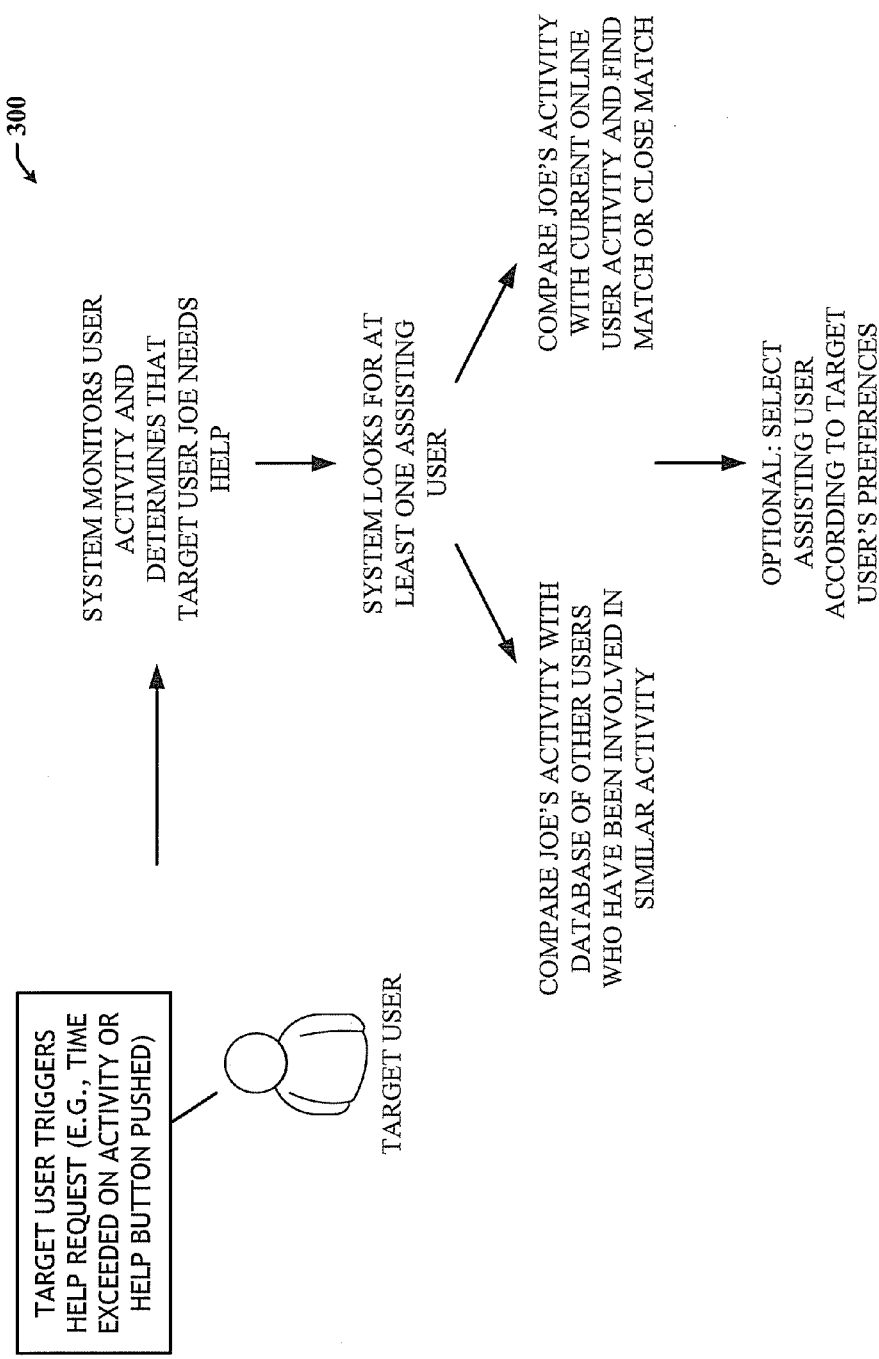
FIG. 3 is an exemplary diagram that demonstrates one manner in which a target user can request assistance on a target activity and receive system or human assistance based on various aspects of the target activity.

Turning now to FIG. 3, there is an exemplary diagram 300 that demonstrates monitoring user activity in order to identify appropriate human resources that are capable of assisting with a target activity. The diagram 300 depicts a target user named Joe who has triggered a help request. The help request can be triggered in at least two different ways: implicitly or explicitly. When a parameter is violated or a threshold is satisfied or exceeded, the system can automatically initiate the help request in order to identify the target activity and target user and determine the type or source of assistance most suitable for Joe and his activity. Parameters or thresholds can relate to the particular activity, to the user's physical state, or to the user's environment. For example, sensors can monitor the user's heart rate, blood pressure, body temperature, galvanic skin response, EMG, brain signals, respiration rate, movement, facial movements, facial expressions, etc. Alternatively, Joe can expressly request assistance.

In this scenario, Joe is spending more time on an activity than was originally allotted (by the system) and as a result may not meet his deadline for the overall project. The system begins looking for at least one assisting user. The criteria to qualify for an assisting user depend on the target user and the target activity. Therefore, the system can analyze the target activity with the current and/or past activities of other users to find at least one other person who has experience in the activity or who is currently working on a similar activity. As previously mentioned, a number of other factors can influence which users are selected to assist the target user. This can include preferences indicated by the target user.

In some cases where time is sensitive or human intervention is likely to have a higher or prohibitive cost, the system can choose between human or non-human resources such as websites, published materials, other files maintained by the system, and/or a FAQ list (frequently asked questions). The system can also provide both types of assistance as deemed appropriate. When no assisting users are available at the moment (e.g., not currently online), the system can send them a message indicating that their assistance is requested to help the target user with the target activity. The system can also notify the assisting users when their assistance is no longer needed (e.g., the problem, question, or delay associated with the target activity has been withdrawn or resolved). Messages and other notifications can be sent via email, SMS, voice, or instant messaging depending on the assisting users' devices.

Figure 4:
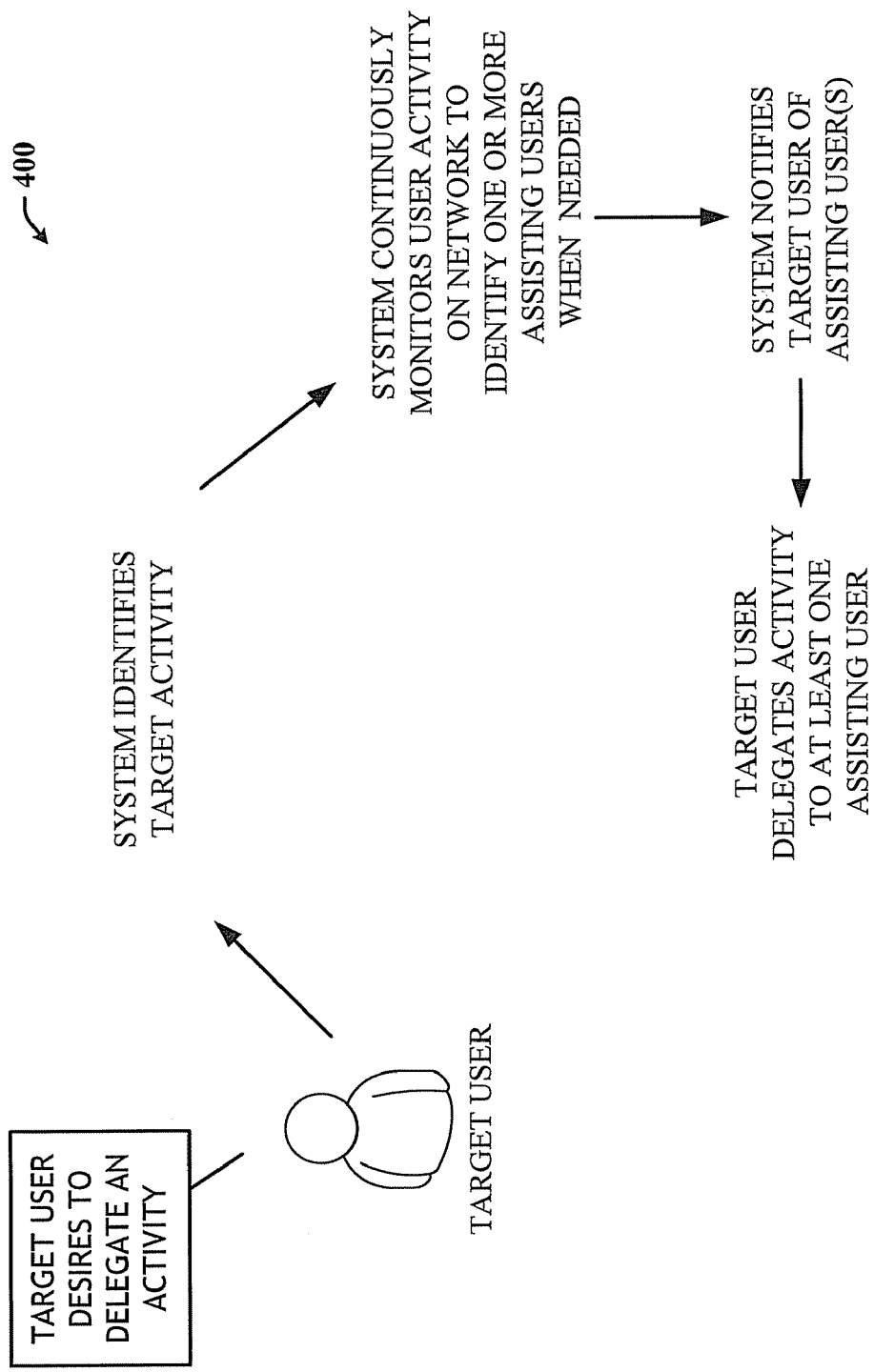
FIG. 4 is an exemplary diagram that demonstrates monitoring user activity in order to identify available and applicable human resources that are capable of performing an assigned task.

Referring now to FIG. 4, there is an exemplary diagram 400 that demonstrates one manner in which a target user can delegate a target activity to one or more other users. In order to do so, the system can identify the target activity or nature of the assignment. Once again, recall that the system is also monitoring the user activity in a continuous manner. As a result, the system can locate or identify one or more assisting users that can handle the target activity to the target user. The target activity can be communicated to the relevant assisting users. Activities that have been delegated or assigned to others in this manner can be tracked and monitored specifically by the relevant target user.

There may be times when no assisting user is available to either take on or assist with the target activity because they are currently involved in other activities. To mitigate such occurrences and optimize the allocation of skilled resources, the system can evaluate priority levels associated with the activities and information associated with the users who are engaged in such activities. For example, a department manager just received a rush project from one of their largest clients. The project involves multiple parts—some of which can be performed concurrently and others that are based on the completion of other parts. Because this project is characterized as a set of higher priority activities, users who are qualified or skilled to work on the various parts can be called away from their current lower priority activities. In addition, the system can notify the appropriate users when a (precursor) part has been completed so that they can begin on their portion of the project. The progress for each team user can also be visualized by the other team members. As a result, the team of users can complete the task with fewer explicit personal communications, thus saving time and conserving system resources.

Figure 5:
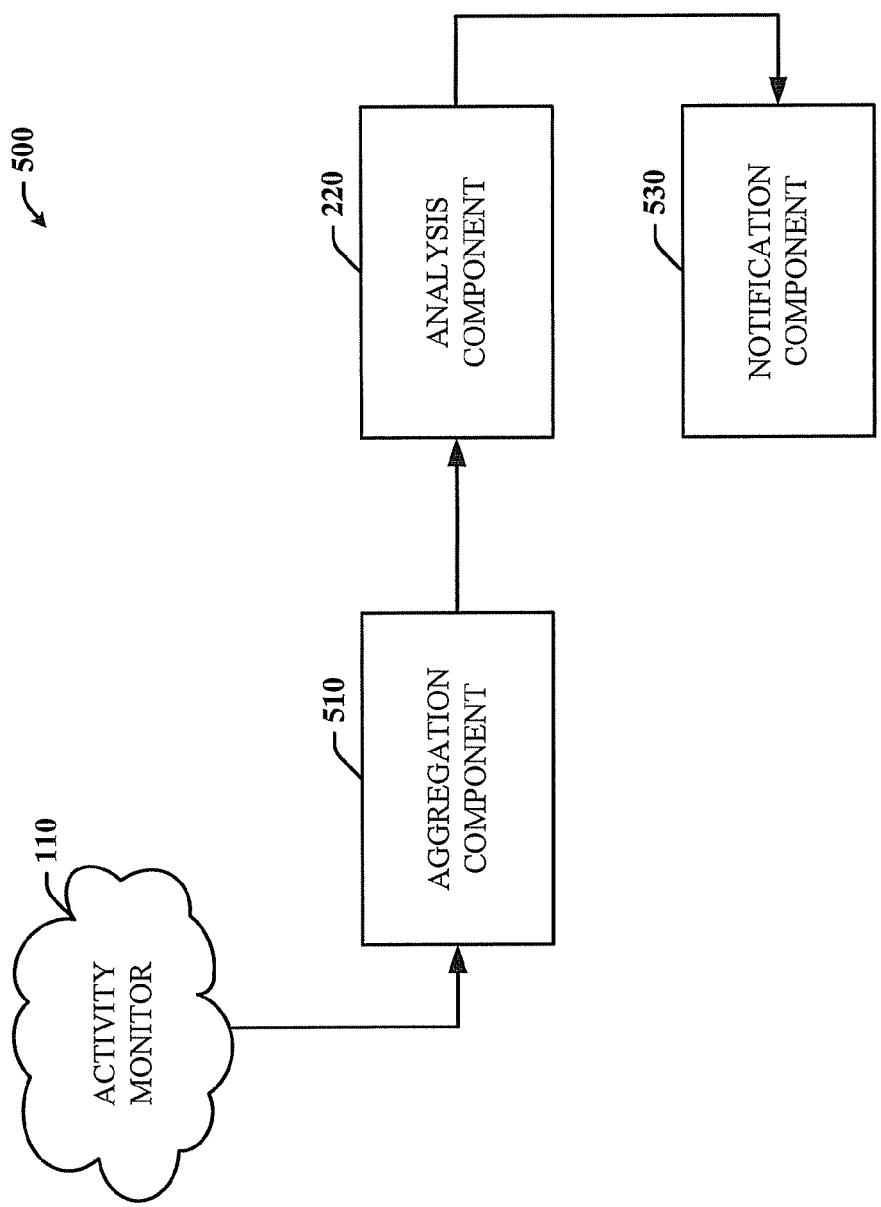
FIG. 5 is a block diagram of an exemplary activity monitoring and management system that facilitates optimizing individual user or group productivity and efficiency.

Turning now to FIG. 5, there is a block diagram of an exemplary activity monitoring system 500 that facilitates optimizing individual user or group productivity and/or promoting the development of social relationships. The system 500 includes an aggregation component 510 that aggregates activity data and the corresponding user data from local and/or remote users. The analysis component 220 can process this data and then group it according to which users appear to be working on the same project or are working on similar tasks. In a work-related setting, this information can be displayed on a user interface for a group manager, for example, to readily view. Thus, the group manager can view the progress and/or performance data of the people he is managing. Even more so, this information can be accessed locally or remotely (e.g., via web link). As a result, groups or related users can view each other's progress from any location. When some group members are located in different cities, states, or countries and across time zones, the ability to view each other's activity data and progress can enhance activity coordination and overall work experience.

The system 500 also includes a notification component 520. A notification component 520 can notify users that they can proceed with their activities based on the completion of prior steps (performed by other users). Likewise, when a user requests feedback on their activity, a notification can be sent to let him know when the feedback has been provided or if it is past due. This can help the user decide the most appropriate next step to take.

In practice, for instance, imagine that a team of scientists and doctors are designing and developing a new line of skin care. The process is long-term and involves the coordination of multiple parts. The team members are located in Austin, Portland, Vietnam, and London. In order to maintain an awareness of each other's activities in a relatively non-intrusive manner, the team can employ the monitoring system 500 to watch and display each member's progress as well as test results, experiment status, experimental data, and the direction that each team member is following, particularly if strategies have changed. Intent can also be inferred by monitoring the team's activities which can be useful to project courses of action and to estimate and allocate necessary resources. The monitoring system 500 can provide this information in real-time, at scheduled times, or on-demand. The information can also be recorded and stored for later retrieval. Moreover, the flow of projects or multi-part activities can be automatically controlled and managed.

Individual users (not associated with a group) can benefit from this information as well. In particular, they can gauge their progress or skill level by comparing their progress with other users who are working on or who have worked on the same or similar activity. They can also learn about the activity by viewing other users' comments or current state with regard to the activity. In addition, they can estimate how much more time is required to complete the activity based on the others' completion times which can be helpful for planning or scheduling purposes.

The system 500 can also improve the distribution of similar or related activities by aggregating similar activities or tasks and assigning them to one or more selected users who could be specifically trained or knowledgeable in the particular activity. For example, suppose Robert works for an investment firm and is highly trained in math, statistics, and finance and is a Certified Public Accountant. Many of the projects the firm is asked to handle have subparts dealing with accounting and statistical calculations. Because Robert is so skilled in this area, he has become substantially efficient in completing such tasks but is far less efficient in other areas. Thus, the system 500 can aggregate similar tasks involving accounting and statistical calculations and then assign them to Robert. New or unfinished tasks can be assigned or re-assigned to Robert since in this case, reassigning them to Robert is arguably more efficient and less costly to the system (and firm) than to have Robert merely provide assistance to other users in the middle of such tasks.

The monitoring system 500 can also be employed to facilitate troubleshooting poor performance or for evaluating high ratings or unexpected trends in either direction on certain activities. For example, in the case of Robert, suppose that his performance scores suddenly begin to decline. His supervisor can view activity data for other users who completed the same or similar activity as Robert. By examining the activity data from various users (e.g., across different departments or teams), Robert's supervisor can identify trends or patterns in the activity data that can be causing the unanticipated decrease in performance scores. For instance, the activity template, instructions, time allotments, or format can be possible reasons for the decrease in performance scores for the majority of users.

On a slightly different note, the system 500 can enhance social experiences among users by binding or bringing users together based on a target activity. For example, the system 500 can locate people that are watching particular TV programs at the same time or performing a similar activity at the same time. Discussion groups or social events can be generated as a result. Thus, the monitoring system 500 can synchronize users in order to improve their individual experiences with the particular activity or to improve the outcome of the activity.

Figure 6:
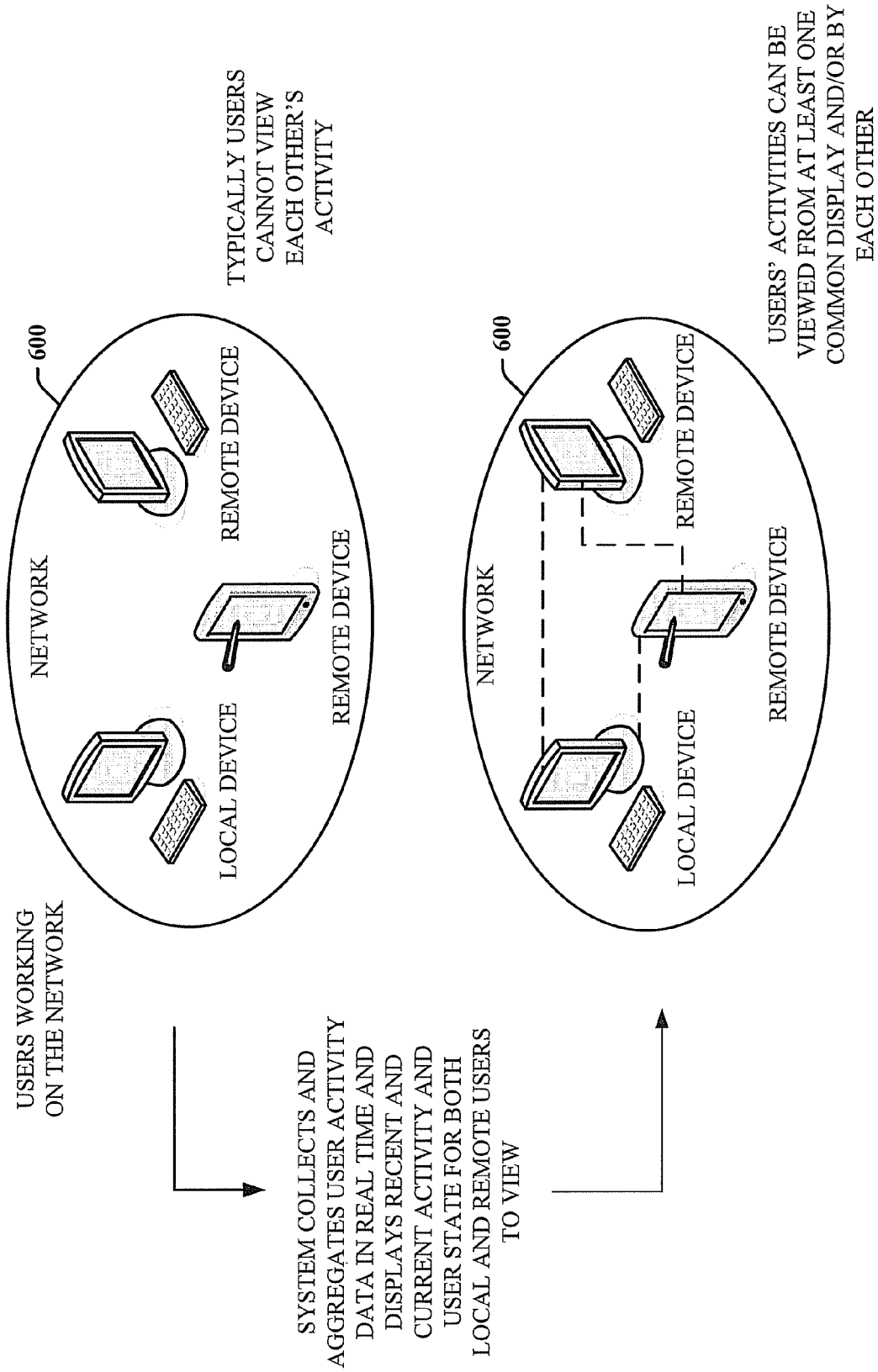
FIG. 6 is an exemplary diagram that demonstrates one manner in which group user activity can be monitored and managed for both local and remote users.

FIG. 6 further illustrates an exemplary demonstration of the system 500 as described above. As shown in the figure, the system 500 monitors and aggregates activity data for a group of users logged onto a network 600 via their respective devices. The data can be gathered in real time or stored offline and then uploaded later when connected to the network. With conventional systems, users typically are unable to view each other's activity aside from seeing that one user is "away" and another user is "busy". In addition, conventional systems lack the ability to automatically relate and aggregate users based on their activities. The subject system 500 allows users to seamlessly coordinate their activities and maintain an awareness of collaborative projects in a relatively non-intrusive manner. Explicit communication between users (e.g., phone calls, emails, leaving messages, etc.) and associated time delays due to different work schedules or time zones can be minimized as well.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 7:
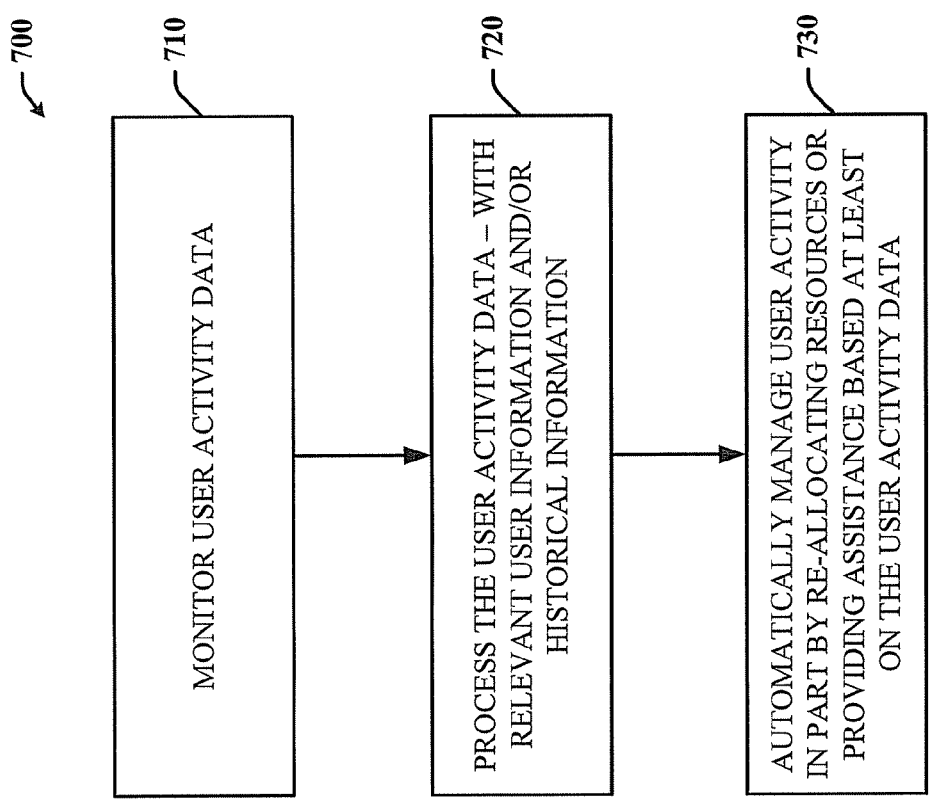
FIG. 7 is a flow diagram of an exemplary method that facilitates managing user activity in order to improve overall user productivity and efficiency.

Referring now to FIG. 7, there is a flow diagram of an exemplary method 700 that facilitates managing user activity in order to improve overall user productivity and efficiency in a computing environment. The method 700 involves monitoring user activity at 710. For example, the method 700 can actively observe and note the activities being performed by one or more users via their respective devices. Devices can include but are not limited to a desktop computer, laptop, peripheral hardware (e.g., printer, scanner, fax machine, keyboard, mouse, speakers, CD/DVD player, etc.) via wire or wireless connections, and handheld computing devices such as smartphone, pocket PC phone, PDA, watch, and remote control. Monitoring can be performed in real-time or stored to a local device and then uploaded to the network and "monitored" when a connection to the network is established.

At 720, the user activity data can be processed according to the subject user's information in order to automatically manage the user's activity in a manner more specific or personal to the particular user. That is, additional resources or assistance can be provided to the user based at least on the user activity data (at 730). For example, user profile information can be employed to determine whether they are the most qualified or most suitable person for an activity or whether other resources would be beneficial to them to successfully complete the activity. The method can also tell the user about other activities or files that are similar to or related to the user's current activity or previous activities.

Their profile information can also help a supervisor, for instance, understand their performance rating and/or predict their efficiency with an activity. It can also indicate whether the user has the basic foundation (e.g., proper device/hardware, software, training, etc.) to carry out certain activities. The user's group memberships can also affect or otherwise influence the manner or order in which activities are assigned to the user. For instance, one group membership can indicate experience with a certain type of technology that might be indirectly related to a new unassigned activity. Moreover, managing users according to their activities (e.g., developing new software) rather than individual documents or applications in isolation of one another results in increased productivity and more efficient employment of resources and skills.

Figure 8:
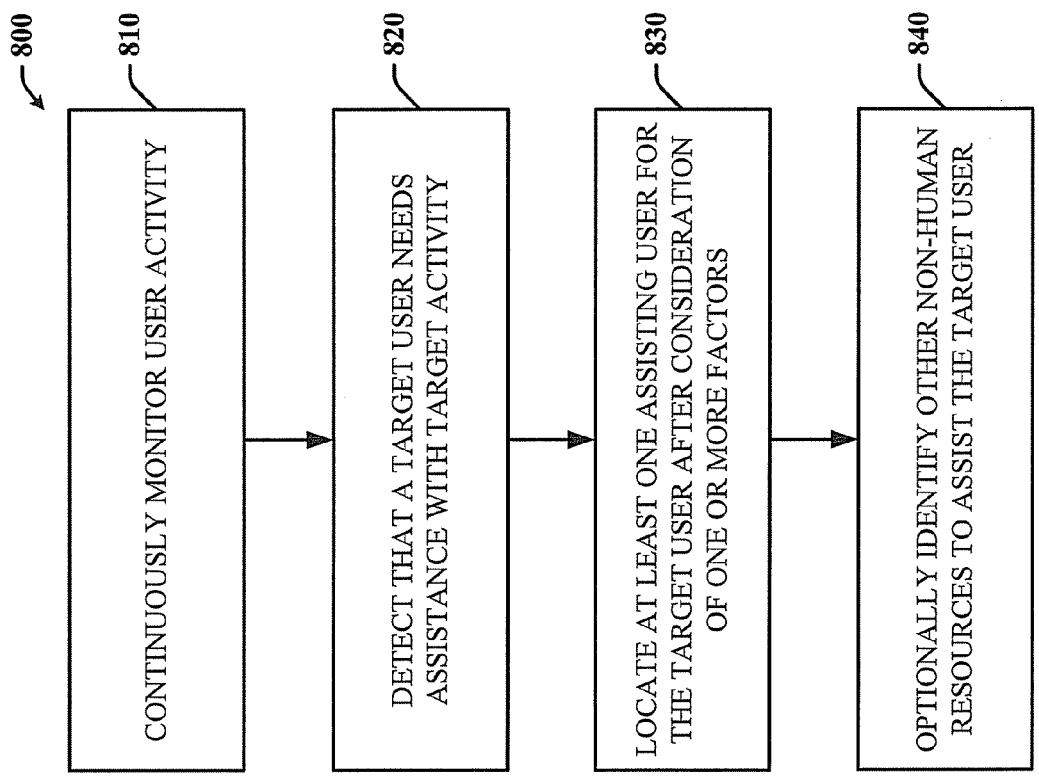
FIG. 8 is a flow diagram of an exemplary method that facilitates finding relevant users to assist other users with an activity.

Turning now to FIG. 8, there is a flow diagram of an exemplary method 800 that facilitates finding relevant users to assist other users with an activity. The method 800 involves continuously monitoring user activity at 810. At 820, the method can detect that a user (target user) needs assistance with his activity (target activity). Detection for assistance can be implicit or explicit. For example, various physiological sensors can detect stress or frustration (e.g., elevated blood pressure, heart rate, or respiration rate). Alternatively or in addition, a time monitor can detect that the user has exceeded the recommended or allotted time to complete the activity (or a sub-part thereof). Otherwise, the user can expressly request assistance such as through clicking a button, sending a message, or making a call. Because user activity is continuously monitored at 810, the method 800 can locate at least one assisting user for the target user at 830.

Assisting users can be chosen based on one or more considerations such as their current state, current activity, similarity or relatedness between current and target activities, background (e.g., education, experience, certifications), geographic location, installed device(s), skill level, priority level of current and target activities, cost, group memberships, and the like. Here, the method 800 can employ current information as well as historical information to facilitate identifying the most appropriate users to assist the target user. In addition to human assistance, the method 800 can optionally identify other non-human resources at 840 in order to assist the target user. Non-human resources can include website links, articles, reference books, or other files.

The above considerations can also be utilized in order to find one or more users to take on, perform, or complete an activity. That is, activities can be delegated or assigned to others using this monitoring method. By doing so, activities can be completed in a more efficient manner and presumably with higher accuracy.

Figure 9:
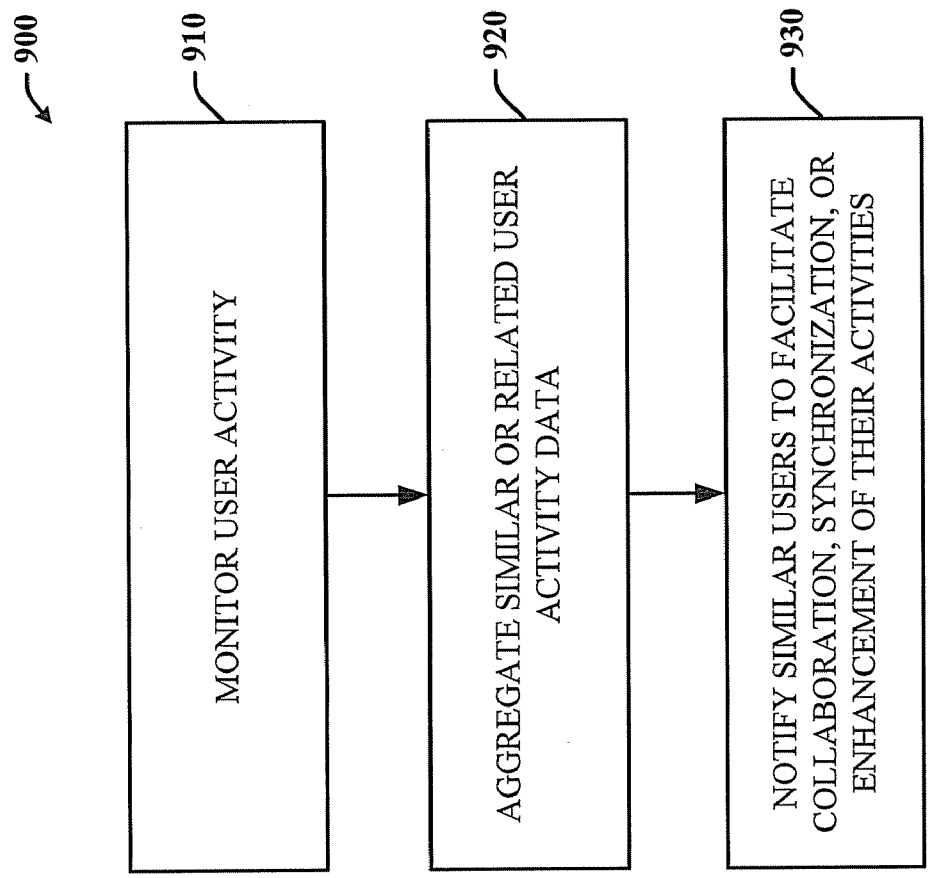
FIG. 9 is a flow diagram of an exemplary method that facilitates collaboration of activities and users in part by monitoring user and/or group activities.

Moving on to FIG. 9, there is a flow diagram 900 of an exemplary method that facilitates collaboration of activities and users in part by monitoring user or group activities. The method 900 involves monitoring online user activity at 910. The activity can be conducted on such devices including portable wireless devices, laptops, and/or desktop computers. At 920, the method 900 can aggregate similar or related user activity data; and at 930, the method 900 can notify users that they are engaged in similar or related activities. As a result, collaboration among users and their respective activities can occur more efficiently, particularly when the synchronicity of activities is desirable.

In addition, users who are involved in similar activities can learn more about the activity to improve their performance or increase their skill level. The aggregated data can be viewed on a user interface in real time or as the data becomes available (offline users can upload their information upon connection to the network or server). The monitoring and aggregation of activity data can also enhance synchronization of certain activities and the scheduled timing of others. For example, a user responsible for performing steps 4 and 5 of an activity can be notified when step 3 has been completed. If step 3 is dependent upon the completion of steps 1 and 2 and step 3 is past due, the user can check on the progress of steps 1 and 2 without interrupting the user(s) responsible for those parts of the activity. Likewise, if the users are located on different continents, their work times may never overlap. The method 900 resolves this problem by providing the activity information to the participating users. Thus, managing users and their activities can be performed automatically with less manual instructions and fewer personal interactions and interruptions which tend to be highly distracting to some users.

The subject systems and/or methods as described above can incorporate various inference schemes and/or techniques in connection with identifying users that need assistance with their activities and that can provide assistance to others with their activities. For example, the system can infer through physiological and activity sensing that a user is becoming more frustrated with his current activity and thus could benefit from assistance from another user who has experience with the same or similar activity. This can be accomplished via parameter and/or threshold settings whereby the detection of parameter violations or satisfied thresholds can indicate a particular frustration level or at the very least that the user has become "frustrated" or "stressed".

As used herein, the term "inference" refers generally to the process of reasoning about or inferring states of the system, environment, and/or user from a set of observations as captured via events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
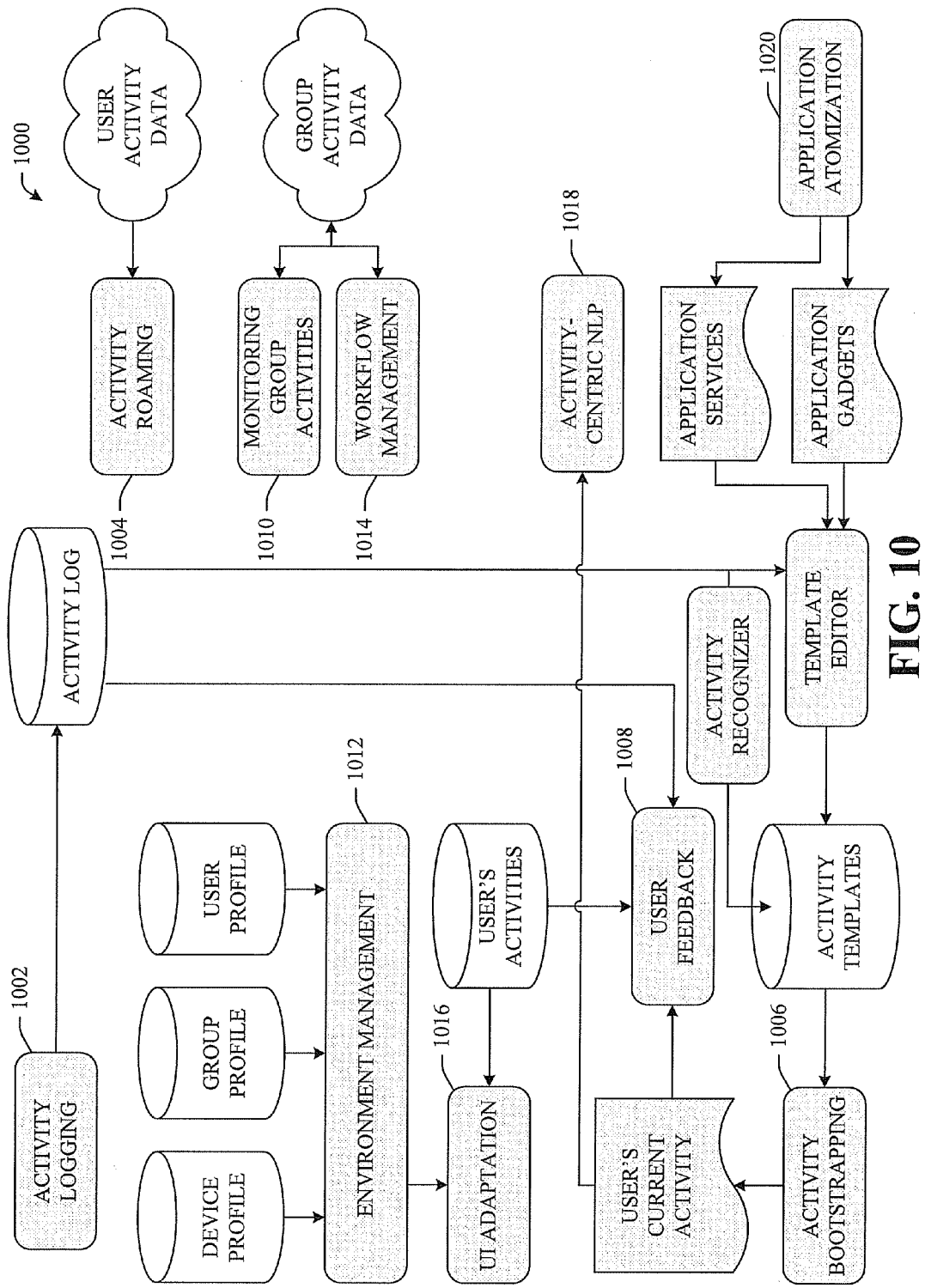
FIG. 10 is a block diagram of an overall activity-centric system that is operable to perform the monitoring and activity-based functionalities described herein.

Turning now to FIG. 10, an overall activity-centric system 1000 operable to perform novel functionality described herein is shown. As well, it is to be understood that the activity-centric system of FIG. 10 is illustrative of an exemplary system capable of performing the novel functionality of the Related Applications identified supra and incorporated by reference herein. Novel aspects of each of the components of system 1000 are described below.

The novel activity-centric system 1000 can enable users to define and organize their work, operations, and/or actions into units called "activities." Accordingly, the system 1000 offers a user experience centered on those activities, rather than pivoted based upon the applications and files of traditional systems. The activity-centric system 1000 can also usually include a logging capability, which logs the user's actions for later use.

In accordance with the innovation, an activity typically includes or links to all the resources needed to perform the activity, including tasks, files, applications, web pages, people, email, and appointments. Some of the benefits of the activity-centric system 1000 include easier navigation and management of resources within an activity, easier switching between activities, procedure knowledge capture and reuse, improved management of activities and people, and improved coordination among team members and between teams.

As described herein and illustrated in FIG. 10, the system 1000 discloses an extended activity-centric system. However, the particular innovation (e.g., monitoring group activity) disclosed herein is part of the larger, extended activity-centric system 1000. An overview of this extended system 1000 follows.

The "activity logging" component 1002 can log the user's actions on a device to a local (or remote) data store. By way of example, these actions can include, but are not limited to include, resources opened, files changed, application actions, etc. As well, the activity logging component 1002 can also log current activity and other related information. This data can be transferred to a server that holds the user's aggregated log information from all devices used. The logged data can later be used by the activity system in a variety of ways.

The "activity roaming" component 1004 is responsible for storing each of the user's activities, including related resources and the "state" of open applications, on a server and making them available to the device(s) that the user is currently using. As well, the resources can be made available for use on devices that the user will use in the future or has used in the past. The activity roaming component 1004 can accept activity data updates from devices and can synchronize and/or integrate them with the server data.

The "activity boot-strapping" component 1006 can define the schema of an activity. In other words, the activity boot-strapping component 1006 can define the types of items it can contain. As well, the component 1006 can define how activity templates can be manually designed and authored. Further, the component 1006 can support the automatic generation, and tuning of templates and allow users to start new activities using templates. Moreover, the component 1006 is also responsible for template subscriptions, where changes to a template are replicated among all activities using that template.

The "user feedback" component 1008 can use information from the activity log to provide the user with feedback on his activity progress. The feedback can be based upon comparing the user's current progress to a variety of sources, including previous performances of this or similar activities (using past activity log data) as well as to "standard" performance data published within related activity templates.

The "monitoring group activities" component 1010 can use the log data and user profiles from one or more groups of users for a variety of benefits, including, but not limited to, finding experts in specific knowledge areas or activities, finding users that are having problems completing their activities, identifying activity dependencies and associated problems, and enhanced coordination of work among users through increased peer activity awareness.

The "environment management" component 1012 can be responsible for knowing where the user is, the devices that are physically close to the user (and their capabilities), and helping the user select the devices used for the current activity. The component 1012 is also responsible for knowing which remote devices might be appropriate to use with the current activity (e.g., for processing needs or printing).

The "workflow management" component 1014 can be responsible for management and transfer of work items that involve other users or asynchronous services. The assignment/transfer of work items can be ad-hoc, for example, when a user decides to mail a document to another user for review. Alternatively, the assignment/transfer of work items can be structured, for example, where the transfer of work is governed by a set of pre-authored rules. In addition, the workflow manager 1014 can maintain an "activity state" for workflow-capable activities. This state can describe the status of each item in the activity, for example, which it is assigned to, where the latest version of the item is, etc.

The "UI adaptation" component 1016 can support changing the "shape" of the user's desktop and applications according to the current activity, the available devices, and the user's skills, knowledge, preferences, policies, and various other factors. The contents and appearance of the user's desktop, for example, the applications, resources, windows, and gadgets that are shown, can be controlled by associated information within the current activity. Additionally, applications can query the current activity, the current "step" within the activity, and other user and environment factors, to change their shape and expose or hide specific controls, editors, menus, and other interface elements that comprise the application's user experience.

The "activity-centric recognition" component or "activity-centric natural language processing (NLP) component 1018 can expose information about the current activity, as well as user profile and environment information in order to supply context in a standardized format that can help improve the recognition performance of various technologies, including speech recognition, natural language recognition, desktop search, and web search.

Finally, the "application atomization" component 1020 represents tools and runtime to support the designing of new applications that consist of services and gadgets. This enables more fine-grained UI adaptation, in terms of template-defined desktops, and well as adapting applications. The services and gadgets designed by these tools can include optional rich behaviors, which allow them to be accessed by users on thin clients, but deliver richer experiences for users on devices with additional capabilities.

In accordance with the activity-centric environment 1000, once the computer understands the activity, it can adapt to that activity. For example, if the activity is the review of a multi-media presentation, the application can display the information differently as opposed to an activity of the UI employed in creating a multi-media presentation. All in all, the computer can react and tailor functionality and the UI characteristics based upon a current state and/or activity. The system 1000 can understand how to bundle up the work based upon a particular activity. Additionally, the system 1000 can monitor actions and automatically bundle them up into an appropriate activity or group of activities. The computer will also be able to associate a particular user to a particular activity, thereby further personalizing the user experience.

In summary, the activity-centric concept of the subject system 1000 is based upon the notion that users can leverage a computer to complete some real world activity. As described supra, historically, a user would outline and prioritize the steps or actions necessary to complete a particular activity mentally before starting to work on that activity on the computer. In other words, conventional systems do not provide for systems that enable the identification and decomposition of actions necessary to complete an activity.

The disclosed activity-centric systems enable automating knowledge capture and leveraging the knowledge with respect to previously completed activities. In other words, in one aspect, once an activity is completed, the subject innovation can infer and remember what steps were necessary when completing the activity. Thus, when a similar or related activity is commenced, the activity-centric system can leverage this knowledge by automating some or all of the steps necessary to complete the activity. Similarly, the system could identify the individuals related to an activity, steps necessary to complete an activity, documents necessary to complete, etc. Thus, a context can be established that can help to complete the activity next time it is necessary to complete. As well, the knowledge of the activity that has been captured can be shared with other users that require that knowledge to complete the same or a similar activity.

Historically, the computer has used the desktop metaphor, where there was effectively only one desktop. Moreover, conventional systems stored documents in a filing cabinet where, there was only one filing cabinet. As the complexity of activities rises, and as the similarity of the activities diverges, it can be useful to have many desktops available that can utilize identification of these similarities in order to streamline activities. Each individual desktop can be designed to achieve a particular activity. It is a novel feature of the innovation to build this activity-centric infrastructure into the operating system such that every activity developer and user can benefit from the overall infrastructure.

The activity-centric system proposed herein is made up of a number of components as illustrated in FIG. 10. It is the combination and interaction of these components that compromises an activity-centric computing environment and facilitates the specific functionalities described herein. At the lowest level, the following components make up the core infrastructure that is needed to support the activity-centric computing environment: Logging application/user actions within the context of activities, User profiles and activity-centric environments, Activity-centric adaptive user interfaces, Resource availability for user activities across multiple devices, and Granular applications/web-services functionality factoring around user activities. Leveraging these core capabilities with a number of higher-level functions are possible, including: providing user information to introspection, creating and managing workflow around user activities, capturing ad-hoc and authored process and technique knowledge for user activities, improving natural language and speech processing by activity scoping, and monitoring group activity.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates managing and optimizing user activity automatically to improve overall user productivity and efficiency, the method comprising:
    monitoring, through at least one computing device, user activity conducted by multiple users on one or more computing devices;
    determining, through the at least one computing device, that a target user needs assistance with a target activity, which comprises completing multiple tasks, because an elapsed time spent on the multiple tasks exceeds an allotted time for the target activity and because a probabilistic analysis detects a problem pattern within the target user's user activity data;
    locating, through the at least one computing device, based on the user activity data, an assisting user to help the target user with the target activity; and
    assigning the target activity to the assisting user.

2. The method of claim 1, wherein the user activity data for the target user is gathered by monitoring user activity conducted by the target user on at least two different computing devices.

3. The method of claim 1, wherein the monitoring the user activity occurs in real-time.

4. The method of claim 1, wherein the method further comprises recording offline user activity and subsequently uploading the offline user activity for monitoring.

5. The method of claim 1 wherein the assisting user is located based on physical proximity to the target user and because the assisting user and the target user are both members of a particular group.

6. The method of claim 1 wherein the assisting user is a co-worker of the target user that has opted into providing assistance to coworkers.

7. The method of claim 1, wherein the target user needs assistance with the target activity when one or more-physiological or environmental sensors to detect at least one of, galvanic skin response, EMG, brain signals, facial movements, and facial expressions, indicate the target user is frustrated.

8. The method of claim 1 wherein the assisting user is located while the assisting user is currently performing the target activity as determined by analysis of the user activity data.

9. The method of claim 1, wherein the assisting user is located based on the assisting user's success/failure history with the target activity.

10. The method of claim 1 wherein the assisting user is located based on the assisting user's current interruptibility as determined by observing that the assisting user is currently browsing the Internet.

11. The method of claim 1 further comprises displaying monitored data on a user-interface in a time-line format in order to notify interested users of an activity's progress or state.

12. A method that facilitates managing and optimizing user activity automatically to improve overall user productivity and efficiency, the method comprising:

monitoring, through at least one computing device, user activity conducted by multiple users on one or more computing devices;

determining, through the at least one computing device, in real-time, based on the user activity data, that a target user needs assistance with a target activity, wherein one or more physiological sensors detect user characteristics that indicate the target user is frustrated, wherein the one or more physiological sensors detect at least one of facial movements and facial expressions that indicate the target user is frustrated;

finding, through the at least one computing device, at least one assisting user to assist the target user with the target activity based on the assisting user's experience with the target activity; and assigning the target activity to the at least one assisting user.

13. The method of claim 12, wherein the assisting user is also selected based on the assisting user's current interruptibility as determined by determining the assisting user's current activity, wherein interruptibility describes a degree of work disruption caused to the assisting user by stopping the assisting user's current activity to assist the target user.

* * * * *